Figure 1:
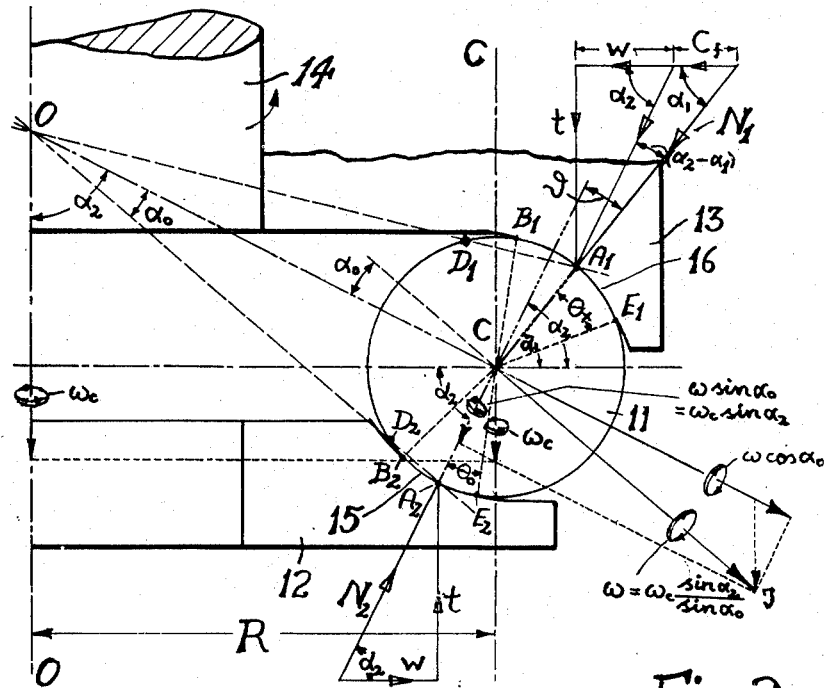

Dec. 30, 1952   M. FRENKEL   2,623,796
ANGULAR CONTACT BALL BEARING
Filed July 21, 1948

Inventor.
Meyer Frenkel

Patented Dec. 30, 1952

2,623,796

UNITED STATES PATENT OFFICE 2,623,796

ANGULAR CONTACT BALL BEARING

Meyer Frenkel, London, England

Application July 21, 1948, Serial No. 39,862
In Great Britain March 4, 1946

5 Claims. (Cl. 308—227)

This application is a continuation in part of the application Serial No. 732,026, filed March 3, 1947, and now abandoned.

This invention relates to angular contact ball bearings. Its object will be understood from the following consideration.

I have proved in my paper "Ball and taper roller bearings," published in the Journal of the Royal Aeronautical Society, London, England (No. 423, vol. 50), that in present constructions of angular contact ball bearings the forces and couples acting on a ball in the operating bearing produce angular velocities of the ball about three mutually normal axes passing through its centre of gravity (that is, spinning and other angular velocities) the magnitudes of which oscillate among themselves. This causes excessive sliding of the balls on their tracks, and, in particular, periodic impact of the balls on their tracks and on the cage, involving vibrations and often breakage of the cage, the said phenomena increasing in severity with rising speed of rotation of the bearing and being largely responsible for the fatigue-effects and generally rapid wear, which impose the present known limits on the maximum speeds of operation and lengths of "life" of angular contact ball bearings, making these incapable of being used at high speeds, with thrust loads.

In many applications, one must, for example, for the above reasons use a number of radial ball bearings in series to take up a thrust load at high speed, instead of using one angular contact ball bearing, which leads to excessive weight and produces troubles, particularly in aero-engines.

The object of this invention is therefore, to provide constructions of angular contact ball bearings, in which the forces and couples acting on the balls in the operating bearing, instead of producing the above troubles, become useful, preventing the harmful effects such as oscillations of the angular velocities of the balls, excessive sliding, impact and the like, from arising at higher speeds, and also causing a state of "true rolling" (not pure rolling) of the balls on the tracks, thereby enabling angular contact ball bearings to be used for any required high speeds and for large thrusts, for which present angular contact ball bearings cannot be used, and for great lengths of life.

In cases, for example, in which at present a number of radial ball bearings are used to take up a thrust load at high speed, the invention thus aims at providing a construction of angular contact ball bearing replacing these by one bearing, thus saving weight, which is of particular importance in aero-engine construction.

My theory published in my paper in the Journal of the Royal Aeronautical Society gives the unified picture of the occurrences in angular contact ball bearings producing the troubles described above, in place of the unrelated fragments of theory hitherto known, and shows the relations between the conditions causing the said troubles, and in this way also the relations between the conditions required to prevent the troubles.

These, clothed in mathematical form, lead to a system of equations relating among themselves all the dimensions of an angular contact ball bearing, and this leads to the constructional provisions of this invention, as described in the following with reference to the accompanying drawings.

Figure 2:
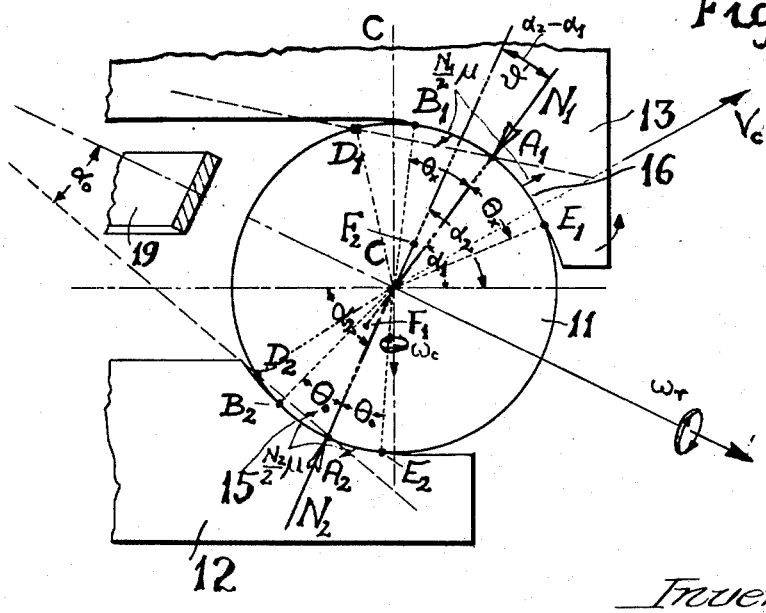

In these accompanying drawings, Fig. 1 is a half-section through one embodiment of an angular contact ball bearing in accordance with the invention, showing also vector-diagrams with reference to which the operation of the invention is described, and Fig. 2 is a detail of Fig. 1 on an enlarged scale.

In Fig. 1, the ball $11$ is shown interposed between an inner bearing ring $12$ having track-groove $15$, and an outer bearing ring $13$ having track-groove $16$, the outer bearing ring $13$ being fixed to rotating shaft $14$, and thus being the driving ring. The profiles of the said track-grooves $15$ and $16$ are respectively symmetrically shaped about axes $A_2CF_2$ and $A_1CF_1$. The enlarged view of the embodiment in Fig. 2, in which like numerals denote like parts, shows the centres of curvature $F_2$ and $F_1$ of the groove-profiles $15$ and $16$ respectively, which are circular in this example, $F_2$ and $F_1$ connected to the centre $C$ of the ball $11$ interposed between the grooves fixing the respective axes of symmetry which, according to the invention, enclose an angle less than 180° at $C$ and where the axis of symmetry $A_1CF_1$ of the outer grooves profile is angularly displaced from the axis of symmetry $A_2CF_2$ for the inner groove-profile towards the direction of the centrifugal force on the ball, as seen from Fig. 1, showing angle $a_1$ less than angle $a_2$, and more particularly from the triangle of forces taking into account the effect of centrifugal force $C_r$. For other shapes of groove-profile, the axes these are symmetrically shaped about are those respectively coinciding with the positions of the radii of curvature of the profiles, which have extreme (maximum or minimum) values, and pass through the centre of the ball interposed between opposing profiles in the unloaded bearing; or in other words, each profile is such that a straight line passing through the centre of the ball interposed between this profile and the opposing one in the unloaded bearing and intersecting the mid-point of each of those chords of one of said profiles, which are perpendicular to said straight line and end in the contact-area between said one profile and said ball, forms the only axis of symmetry of said one profile.

The acute angle formed between such axes of symmetry $A_1CF_1$ and $A_2CF_2$, denoted by $\vartheta$, is related, according to this invention, to the leading dimensions of the bearing by the condition $$\frac{R}{r} = \frac{\sin \alpha_2}{\tan \vartheta/2} \cdot \frac{k}{1+k} = \frac{\sin \alpha_2}{\tan \vartheta/2} \cdot \frac{i^2}{r^2+i^2}$$

in which R is the radius of the path of the centres of gravity C of the balls about the bearing axis OO (hereafter referred to as pitch-circle radius R), $r$ is the ball radius and $i$ the diametral radius of gyration of the ball, the quantity $$k = \frac{i^2}{r^2}$$

and $\alpha_2$ is the angle of contact of the bearing, which is the angle between the rolling-axis of the ball, CO, and the bearing axis OO, the rolling axis being the line through the ball-centre C and normal to the above-defined axis of symmetry of the groove-profile in the non-driving track.

Fig. 2 further shows an inner ring 19 of the cage or ball-separator.

Other quantities shown in Figs. 1 and 2 in connection with the constructional provisions of the invention to be described in the following, are:

$B_2A_2E_2$ is the length, in the plane containing the bearing axis, of the continuous contact-area under load between the ball 11 and the inner, non-driving track 15. Half of this length, $B_2A_2$ or $A_2E_2$ subtends an angle $\theta_0$ at the ball-centre C as indicated. Similarly, $B_1A_1E_1$ is the length of the contact area under load between the ball and the outer, driving, track-groove 16, half of which, $A_1B_1$ or $A_1E_1$ subtends an angle $\theta_x$ at the ball-centre C, as indicated.

These contact-areas between the ball and its appurtenant tracks are formed under the resultant pressure-forces $N_1$ and $N_2$ on the ball from the outer and inner tracks respectively. The force $N_2$ from the inner track is due to the radially directed load component $w$ and to the axially directed load component $t$ on the ball in question, as seen from the triangle of forces at $A_2$ in Fig. 1, and is here shown to enclose the angle $\alpha_2$ equal to the angle of contact of the bearing with the normal to the bearing axis. The force $N_1$ from the outer track is due to the axial load component $t$, to the radial load component $w$ and to the centrifugal force $C_f$ on the ball, as shown in the triangle of forces at $A_1$, and encloses the angle $\alpha_1 = \alpha_2 - \vartheta$ with the normal to the bearing axis in the case shown.

The dimensions of these contact-areas under load are determined according to the theory of elasticity, for example from the relevant theory of elastic deformation by Heinrich Hertz, from the resultant pressure forces acting and from the constructed radii of curvature of the groove-profiles in planes containing the bearing axis. In the example shown in Figs. 1 and 2, in which these profiles are circular, these are respectively the radius of curvature $A_1F_1 = \rho_1$ for groove 16, and $A_2F_2 = \rho_2$ for groove 15, although this invention also includes groove-profiles of other shapes symmetrically shaped about axes, the radius of curvature of the contour which has an extreme value and thus defines the said axis of symmetry, being hereafter referred to as the central radius of curvature of the groove-profile.

Conversely, when according to the conditions of this invention, certain lengths of contact areas, in the planes containing the bearing axis and the centre of the ball in question, are to arise under load, one is enabled from the theory of elasticity to determine accordingly the central radii of curvature of the respective groove-profiles which are required to bring about such lengths under load.

A further provision of this invention, limiting the constructed central radii of curvature $\rho_1$ and $\rho_2$ of the opposing groove-profiles in relation to the ratio of the pitch-circle radius R to the ball radius $r$ and to the angle of contact $\alpha_2$ of the bearing, is given with reference to Fig. 2 by the following conditions:

The lengths $A_1B_1$ and $A_2B_2$, in the plane containing the bearing axis, of half the contact areas under load between the ball and the driving and non-driving tracks respectively, which lengths each determine the respective central radius of curvature of its appurtenant groove-profile through the known functions of the theory of elasticity, are each respectively smaller than the corresponding lengths of periphery $A_1D_1$ and $A_2D_2$ of the ball cut off by the lines $A_1O$ and $A_2O$ which respectively connect the base-points $A_1$ and $A_2$ of the axes of symmetry $A_1CF_1$ and $A_2CF_2$ of the groove-profiles in the driving and non-driving bearing rings with the point O on the bearing axis at which the rolling axis CO of the ball, through the ball centre C and normal to the axis of symmetry $A_2CF_2$ of the groove-profile in the non-driving bearing ring, intersects the said bearing axis. Thus $$\frac{A_2B_2}{A_1B_1} = \frac{A_2D_2}{A_1D_1}$$

$$A_1E_1 = A_1B_1 \leqslant A_1D_1 \text{ and } A_2B_2 = A_2E_2 \leqslant A_2D_2$$

This condition is related to the ratio of the pitch-circle radius R to ball radius $r$ and to the angle of contact $\alpha_2$ of the bearing through the geometry of Figs. 1 or 2 as follows:

Expressed through the angles subtended at the ball-centre C in the plane containing the bearing axis by the lengths $A_2B_2$ and $A_2D_2$ relating to the non-driving track, the above condition reads:

$$\theta_0 = A_2\hat{C}B_2 \leqslant A_2\hat{C}D_2 = 2\alpha_0$$

the angle subtended at the ball centre by the cut-off length of periphery being $2\alpha_0$, i. e. from the geometry of Fig. 1, $$A_2\hat{C}D_2 = 2 \cdot A_2\hat{O}C = 2\alpha_0$$

where angle $\alpha_0$ is further determined from the geometry of Fig. 1 by the ratio of the pitch-circle radius R to the ball radius $r$ and by the angle of contact $\alpha_2$ of the bearing according to $$\tan \alpha_0 \cdot \frac{R}{r} = \sin \alpha_2$$

Therefore, the above conditions necessary for the prevention of the troubles in angular contact ball bearings, through limiting the lengths of the contact areas under load between a ball and its tracks, which lengths each determine the central radii of curvature of their appurtenant groove-profile through the known functions of the theory of elasticity, limits the said central radii of curvature $\rho_1$ and $\rho_2$ of the opposing groove-profiles in relation to the ratio of the pitch-circle radius $R$ to ball radius $r$ and to angle of contact $\alpha_2$ of the bearing.

Further according to the invention, the constructed central radii of curvature $\rho_1$ and $\rho_2$ of the opposing groove-profiles are each determined as function of the leading dimensions $R$, $r$ and angle of contact $\alpha_2$ by the condition, essential for the prevention of the troubles in angular contact ball bearings, that the following equations, containing the dependent variables $\Theta_0$, $\Theta_x$, $\alpha_0$, $\alpha_x$, and $\vartheta$, and apart from these the leading dimensions $R$, $r$ and $\alpha_2$ of the bearing, determine the angles $\Theta_0$ and $\Theta_x$ and thereby the required lengths of the contact-areas between balls and track-grooves under load, as functions of the leading dimensions $R$, $r$ and $\alpha_2$ of the bearing. The equations, are:

$$\frac{R}{r}=\frac{\sin\alpha_2}{\tan\alpha_0}$$

where $\alpha_0$ is related to angles $\Theta_0$, $\Theta_x$ and $\alpha_2$ by $$\tan\frac{\vartheta}{2}=\frac{k}{1+k}\tan\alpha_0=\frac{i^2}{i^2+r^2}\tan\alpha_0$$

$$\frac{\sin\alpha_x}{\sin\alpha_0}=\frac{\cos(\alpha_x+\vartheta)}{\cos\alpha_0}$$

$$\frac{\sin(\alpha_2-\vartheta)}{\sin\alpha_2\cos\vartheta}\left[1-\frac{(\delta_1+\delta_2)\sin\vartheta}{\sigma_0(1+\cos\vartheta)}\right]=$$
$$\frac{\sigma_x}{\sigma_0}\left[1+\frac{\tan\vartheta\sin\vartheta}{(1+\cos\vartheta)}\right]-$$
$$\frac{\delta_1}{\sigma_0}\frac{\tan\vartheta}{(1+\cos\vartheta)}\left[1+\frac{\sin(\alpha_2-\vartheta)}{\sin\alpha_2}\right]$$

where $$\sigma_x=r\cdot\tan\left(\frac{\Theta_x}{2}\right)+\frac{\Theta_x}{\sin\Theta_x}\cdot\frac{(\delta_1+\delta_2)}{4}$$

and $$\sigma_0=r\cdot\tan\left(\frac{\Theta_0}{2}\right)+\frac{\Theta_0}{\sin\Theta_0}\cdot\frac{\delta_2}{4}\left(1+\frac{\delta_2}{\delta_1}\right)$$

with $\delta_1$ and $\delta_2$ the coefficients (lever arms) of "rolling friction" between the ball and the outer and inner tracks respectively. In this system $\alpha_x$ and $\vartheta$ are further quantities and $$k=\frac{i^2}{r^2}$$

with $i$ the diametral radius of gyration of the ball.

The angles $\Theta_0$ and $\Theta_x$ having thereby been determined as function of the leading dimensions $R$, $r$ and $\alpha_2$ the known functions of the theory of elasticity, e. g., according to the Hertzian theory, enable the central radii of curvature $\rho_1$ and $\rho_2$ of the respective groove-profiles, required to bring about these lengths of contact areas under load, to be determined, thereby determining the central radius $\rho_1$ as well as radius $\rho_2$ of curvature of the groove-profiles as functions of the ratio of the pitch-circle radius $R$ to the ball radius $r$ and of the angle of contact $\alpha_2$.

Further, in order to prevent the troubles in angular contact ball bearings, the ratio of pitch-circle radius $R$ to ball radius $r$ is determined as function of the external load on a bearing and of its speed of rotation, as well as of the angle of contact $\alpha_2$ of the bearing and the acute angle $\vartheta$ enclosed between the axes of symmetry of opposing groove profiles, according to $$\frac{R}{r}=\left[\frac{2}{C_f}\frac{t}{\sin\alpha_2}+2\cos\alpha_2\right]\frac{k}{1+k}+\tan\frac{\vartheta}{2}\sin\alpha_2\cdot\frac{k}{1+k}$$

where $t$ is the axial component of the load on the ball in question, and $C_f$ is the centrifugal force on a ball. According to this invention, the angle of contact $\alpha_2$ and the constructed angle $\vartheta$ are further limited by the condition $$C_f\left(1-\frac{r}{R}\cos\alpha_2\cdot\sin\alpha_2\right)\sin(\alpha_2-\vartheta)\leq\frac{t\mu_s}{0.4}$$

in which $\mu_s$ is the coefficient of sliding friction between the ball and its track-surface.

In cases, in which the factor $$\tan\frac{\vartheta}{2}\sin\alpha_2$$

is negligibly small, the ratio of pitch-circle radius $R$ to ball radius $r$ is determined as function of the angle of contact $\alpha_2$ of the bearing and of the external load on the bearing and its speed of rotation, by equation $$\frac{R}{r}=\left[\frac{2}{C_f}\frac{t}{\sin\alpha_2}+2\cos\alpha_2\right]\frac{k}{1+k}$$

The equations show that in each case a range of external loads and of speeds of rotation is covered.

The main condition, from which spring all other conditions and the constructions necessary to prevent the troubles in angular contact ball bearings at high speeds, is that the forces and couples acting on a ball in the operating bearing should give the ball such an angular velocity, that the velocity vector $V_c$ of the ball centre of gravity, and the couple of the tangential friction forces from the tracks, which serves to overcome the rolling resistance of the ball and with changing shaft speed to change its rolling angular velocity, and which is coplanar with velocity vector $V_c$, should always lie in one and the same diametral plane of the ball, so that the ball should always have the same rolling axis.

If this is not the case, the said couple due to the friction forces from the tracks will develop angular velocities in different diametral planes of a ball, which leads, as proved, to the troubles in angular contact ball bearings already described.

The velocity vector $V_c$ of the ball centre of gravity, describing its circular path about the bearing axis $OO$, has the same angular velocity $\omega_c$ with reference to the axis $CC$ through the ball centre and parallel to the bearing axis, as the centre of gravity $C$ has in its circular motion about the bearing axis $OO$, and therefore—as seen with reference to Fig. 1—the velocity vector $V_c$, and thus also the rolling couple co-planar with it, has the angular velocity $\omega_c\sin\alpha_2$ about the axis $A_2C$. Hence, in order that velocity vector $V_c$ and the rolling couple co-planar with it should always lie in the same diametral plane of the ball, the ball must have the same angular velocity $\omega_c\sin\alpha_2$ about axis $A_2C$. If, as shown on Fig. 1, the resultant angular velocity vector of the ball in the plane containing its centre $C$ and the bearing axis $OO$ is $\omega$, represented by line $CJ$ enclosing the angle $\alpha_0$ with the rolling-axis $CO$, then, for the fulfillment of the above condition $$\omega\sin\alpha_0=\omega_c\sin\alpha_2$$

and in connection with the condition for rolling at point $A_2$, that is that point $A_2$ on the ball be instantaneously at rest, making the line $A_2O$ connecting $A_2$ with the point of intersection $O$ of the rolling and bearing axes, which is also at rest, the instantaneous axis of motion of the ball, one obtains that the angle $\alpha_0$ between the resultant angular velocity vector $\omega$ and the rolling axis must be $\alpha_0 = A_2\hat{O}C$. In connection with my theory relating to the instanteous axis of change of motion of the ball (given in my paper), the condition $$\frac{R}{r} \cdot \tan \frac{\vartheta}{2} = \sin \alpha_2 \cdot \frac{k}{1+k}$$

results, requiring the constructional provision, that the axes of symmetry of opposing groove-profiles intersect to form acute angle $\vartheta$.

Considering the relative motion in the contact-area between the ball and the non-driving track 15, with reference to Fig. 2, it is seen that points on the ball 11 below the instantaneous axis of motion $A_2D_2O$, about which the ball instantaneously rotates, have velocities relative to the fixed track in the direction opposite to the velocity vector $V_c$ of the ball centre of gravity $C$, and therefore the sliding friction force on the ball from the contact area falling between $A_2$ and $D_2$ is in the direction of $V_c$. Similarly, all points outside $A_2D_2$ on the ball have relative velocities in the direction of $V_c$, and therefore friction forces from contact-area falling beyond $A_2$ or $D_2$ are opposite to $V_c$. The contact-area between ball and track, however, is symmetrical about point $A_2$, and therefore, as long as it does not extend beyond point $D_2$, the sliding friction forces $$\frac{N_2}{2} \cdot \mu$$

from the portions of the contact area to both sides of $A_2$ are opposite and equal, giving no resultant parallel to $V_c$, but only a friction couple acting on the ball. However, if the contact-area between ball and track were to extend beyond $D_2$, the friction forces from the parts of the contact-area outside $A_2D_2$ will exceed those from the parts between $A_2D_2$, so that a resultant friction force on the ball opposite to $V_c$ arises, which at constant shaft speed would form a couple on the ball changing its angular velocity about axis $A_2C_2$, thereby causing, spin of the ball with all its attendant troubles. The condition to prevent this is that half the length of contact-area under load $$A_2B_2 = A_2E_2 < A_2D_2$$

at the non-driving track, and from a similar consideration that for the driving track $$A_1B_1 = A_1E_1 < A_1D_1$$

In connection with the condition that at constant shaft speed the energy imparted to the ball by the friction-couple from the driving track rotating about axis $A_1C$ with angular velocity $\omega \sin(\alpha_0 - \vartheta)$ must equal the energy lost by the ball through the friction-couple from the non-driving track rotating about axis $A_2C$ with angular velocity $\omega \sin \alpha_0$, the conditions, that $$\frac{A_2B_2}{A_1B_1} = \frac{A_2D_2}{A_1D_1}$$

or, in angles $$\frac{\theta_0}{\theta_x} = \frac{\alpha_0}{\alpha_x + \vartheta}$$

arise, and the other conditions claimed in claim 4, which, through the known functions of the theory of elasticity, determined the constructed central radii of curvature $\rho_1$ and $\rho_2$ of the opposing groove-profiles in the bearing rings, as functions of the leading dimensions of the bearing, namely the ratio $$\frac{R}{r}$$

and the angle of contact $\alpha_2$ of the bearing.

In connection with the condition that the load on the bearing and the centrifugal force acting on the balls must produce the forces and couples on a ball to give it the motion required, the conditions claimed in claims 5 and 6 arise, determining the leading dimensions of the bearing as function of the ranges of external load on the bearing and its speed of rotation.

I claim:

1. A ball bearing comprising two bearing rings, each having a grooved track, and a set of balls interposed between said grooved tracks with area-contact at each track, the mid-point of the area of contact of a ball with one track being more remote from the axis of the assembled bearing than the mid-point of the contact-area of said ball with the second track, each of said grooved tracks having a profile in a plane containing the axis of the assembled bearing and the center of a ball, such that, for each one of said profiles, a straight line passing through the center of said ball in the unloaded bearing and intersecting the midpoint of a chord of said one profile, which is perpendicular to said straight line and ends in the contact-area between said one profile and said ball, forms the only axis of symmetry of said one profile, the said axes of symmetry of the opposing profiles in the same plane through the axis of the assembled bearing enclosing an angle less than 180° and the axis of symmetry of the profile of said one track being angularly displaced with respect to the axis of symmetry of the profile of the said second track towards the direction of the centrifugal force on said ball.

2. A ball bearing as claimed in claim 1 in which the said axes of symmetry of the opposing groove-profiles form an acute angle $\vartheta$, the tangent of half of which, in any plane containing the bearing axis, multiplied by the ratio of the pitch-circle radius $R$ to the ball radius $r$ substantially equals the ratio of the square of the diametral radius of gyration $i$ of the ball to the sum of the squares of the said radius of gyration $i$ and of the radius $r$ of the ball, multiplied by the sine of the angle of contact $\alpha_2$ of the bearing, enclosed in the said plane of reference between the normal to the above-defined axis of symmetry of the groove-profile in the non-driving track and the bearing axis, in accordance with $$\frac{R}{r} \tan \frac{\vartheta}{2} = \frac{i^2}{i^2 + r^2} \sin \alpha_2$$

3. A ball bearing as claimed in claim 1 in which the constructed central radii of curvature of opposing groove-profiles in the two bearing rings are determined through the ratio of the pitch-circle radius $R$ to the ball radius $r$ and the angle of contact $\alpha_2$ of the bearing by the condition that the angles $\theta_0$ and $\theta_x$ subtended at the ball-centre in a plane containing the bearing-axis by half the lengths of the continuous contact-areas under load between the ball and the non-driving and driving tracks respectively— which lengths each determine the respective central radius of curvature of its appurtenant groove-profile through a known function—are determined as function of the ratio $$\frac{R}{r}$$

and of the angle of contact $\alpha_2$ of the bearing from the following equations $$\frac{R}{r} = \frac{\sin \alpha_2}{\tan \alpha_0}$$

where quantity $\alpha_0$ is defined in relation to angles $\theta_0$, $\theta_x$ and $\alpha_2$ by $$\tan \frac{\vartheta}{2} = \frac{i^2}{i^2 + r^2} \tan \alpha_0$$

$$\frac{\sin \alpha_x}{\tan \alpha_0} = \frac{\cos (\alpha_x + \vartheta)}{\cos \alpha_0}$$

$$\frac{\sin (\alpha_2 - \vartheta)}{\sin \alpha_2 \cos \vartheta} \left[ 1 - \frac{(\delta_1 + \delta_2) \sin \vartheta}{\sigma_0 (1 + \cos \vartheta)} \right] =$$
$$\frac{\sigma_x}{\sigma_0} \left[ 1 + \frac{\tan \vartheta \sin \vartheta}{(1 + \cos \vartheta)} \right] -$$
$$\frac{\delta_1}{\sigma_0} \frac{\tan \vartheta}{(1 + \cos \vartheta)} \left[ 1 + \frac{\sin (\alpha_2 - \vartheta)}{\sin \alpha_2} \right]$$

where $$\sigma_x = r \cdot \tan\left(\frac{\theta_x}{2}\right) + \frac{\theta_x}{\sin \theta_x} \frac{(\delta_1 + \delta_2)}{4}$$

and $$\sigma_0 = r \cdot \tan\left(\frac{\theta_0}{2}\right) + \frac{\theta_0}{\sin \theta_0} \frac{\delta_2}{4} \left(1 + \frac{\delta_2}{\delta_1}\right)$$

with $\delta_1$ and $\delta_2$ the coefficients of rolling friction between the ball and the said first and second track respectively, and in which $\alpha_x$ and $\vartheta$ are further quantities and $i$ is the polar radius of gyration of the ball.

4. A ball bearing as claimed in claim 1 in which the ratio of the pitch-circle radius R to the ball radius $r$ are determined as function of the angle of contact $\alpha_2$ of the bearing, of the acute angle $\Theta$ formed between the axes of symmetry of opposing groove-profile in a plane containing the bearing axis, and of the range of external loads on the bearing and of its speeds of rotation, according to the equation $$\frac{R}{r} = \left(\frac{2}{C_f} \frac{t}{\sin \alpha_2} + 2 \cos \alpha_2\right) \frac{k}{1+k} + \tan \frac{\vartheta}{2} \cdot \sin \alpha_2 \frac{k}{1+k}$$

in which $t$ is the axial load on a ball in question and $C_f$ the centrifugal force acting on the ball, and $$k = \frac{i^2}{r^2}$$

with $i$ the polar radius of gyration of the ball, the angle of contact $\alpha_2$ and the angle $\Theta$ of the bearing being further limited by the condition $$C_f \left(1 - \frac{r}{R} \cos \alpha_2 \sin \alpha_2\right) \sin (\alpha_2 - \vartheta) \leq \frac{t \cdot \mu_s}{0.4}$$

in which $\mu_s$ is the coefficient of sliding friction between the ball and its track-surface.

5. A ball bearing as claimed in claim 1 in which the ratio of the pitch-circle radius R to the ball radius $r$ being determined as function of the angle of contact $\alpha_2$ of the bearing and of the range of external loads on the bearing and of its speeds of rotation, according to the equation $$\frac{R}{r} = \left(\frac{2}{C_f} \frac{t}{\sin \alpha_2} + 2 \cos \alpha_2\right) \frac{1}{1+k}$$

in which $t$ is the axial load on a ball in question, $C_f$ the centrifugal force acting on the ball, and $$k = \frac{i^2}{r^2}$$

with $i$ the polar radius of gyration of the ball.

MEYER FRENKEL.

REFERENCES CITED

The following references are of record in the file of this patent:

UNITED STATES PATENTS

| Number | Name | Date |
|---|---|---|
| 1,769,933 | Arutunoff | July 8, 1930 |
| 1,931,871 | Large | Oct. 24, 1933 |
| 2,102,952 | Hellyar | Dec. 21, 1937 |
| 2,316,449 | Parker | Apr. 13, 1943 |